(12) United States Patent
Iverson

(10) Patent No.: US 6,496,882 B2
(45) Date of Patent: Dec. 17, 2002

(54) METHOD AND SYSTEM FOR VIRTUAL MEMORY COMPRESSION IN AN EMBEDDED SYSTEM

(75) Inventor: Timothy J. Iverson, Los Gatos, CA (US)

(73) Assignee: Cisco Technology, INC, San Jose, CA (US)

( * ) Notice: Subject to any disclaimer, the term of this patent is extended or adjusted under 35 U.S.C. 154(b) by 0 days.

(21) Appl. No.: 09/960,853

(22) Filed: Sep. 21, 2001

(65) Prior Publication Data

US 2002/0049871 A1 Apr. 25, 2002

Related U.S. Application Data

(63) Continuation of application No. 09/087,382, filed on May 29, 1998, now Pat. No. 6,332,172.

(51) Int. Cl.$^7$ ............................ G06F 13/12; G06F 13/28
(52) U.S. Cl. ............................ 710/68; 710/65; 711/165; 345/202
(58) Field of Search ...................... 710/65, 68; 711/165; 345/202

(56) References Cited

U.S. PATENT DOCUMENTS

| | | | |
|---|---|---|---|
| 5,237,460 A | 8/1993 | Miller et al. | 360/8 |
| 5,490,260 A | 2/1996 | Miller et al. | 395/427 |
| 5,544,349 A | 8/1996 | Berry et al. | 395/492 |
| 5,559,978 A | 9/1996 | Spilo | 395/413 |
| 5,581,736 A | 12/1996 | Smith | 395/497.01 |
| 5,696,926 A | 12/1997 | Culbert et al. | 395/413 |
| 5,696,927 A | * 12/1997 | MacDonald et al. | 711/207 |
| 5,940,871 A | * 8/1999 | Goyal et al. | 711/206 |
| 6,130,759 A | * 10/2000 | Blair | 358/1.17 |

* cited by examiner

Primary Examiner—Matthew Kim
Assistant Examiner—Pierre M. Vital
(74) Attorney, Agent, or Firm—Van Pelt & Yi LLP

(57) ABSTRACT

The present invention provides a system and method for reducing memory requirements in a low resource computer system. Although examples herein are described in terms of embedded systems, the present invention is equally applicable to other low resource computer systems, such as palmtops, and laptops. Memory requirements, such as RAM requirements, can be reduced by combining virtual memory with a secondary memory with statically compressed contents. According to embodiments of the present invention, executable image of memory, such as the image of RAM, is compressed at image production time. The compressed image is then stored in a non-volatile memory, such as FLASH memory. At run-time, when a request identifying a virtual address is received, it is determined whether a physical address in the physical memory, such as RAM, is associated with that virtual address. If there is no physical memory associated with that virtual address, then a physical address is obtained to be associated with that virtual address. The obtained physical address can be either an available physical address (having no current association with a virtual address), or a physical address which is made available (by severing a current association with a virtual address). Data related to the requested virtual address may be extracted from the compressed image stored in the non-volatile memory, decompressed, and stored in RAM at the location of the obtained physical address. The physical address may then be mapped in order to be associated with the requested virtual address.

17 Claims, 20 Drawing Sheets

[NVRAM: DC data table/compressed VPN$_X$]

DC data offset

Figure 14

METHOD AND SYSTEM FOR VIRTUAL MEMORY COMPRESSION IN AN EMBEDDED SYSTEM

This is a continuation of application Ser. No. 09/087,382, filed May 29, 1998, U.S. Pat. No. 6,332,172 which is hereby incorporated by reference.

FIELD OF THE INVENTION

The present invention relates generally to embedded systems. In particular, the present invention relates to a system and method for utilizing virtual memory in an embedded computer system.

BACKGROUND OF THE INVENTION

An embedded computer system typically refers to a computer which is physically embedded within a larger system and whose primary purpose is to maintain some property or relationship between the other components of the system in order to achieve the overall system objective. Embedded computers are now used in a wide variety of systems, such as aircraft, automobiles, appliances, weapons, medical devices, and computer peripheral devices.

Embedded software presents a unique problem and requires a different type of development strategy than other types of software, such as data processing or transaction systems where the computer is at the center of the application. In the computer-centralized system, peripheral equipment with which the computer interacts, such as input, storage, and output devices, is there to serve the needs of the computer and not vice versa. In this type of system, the behavior of the other components of the system are usually known and often designed or chosen with the needs of the computer as the guiding feature. In the embedded system, the computer is typically used to service the needs of the other components; thus, its behavior and design is usually severely constrained by the external process being controlled. Furthermore, the knowledge about the behavior of the physical processes may only be partially known and is often continuous and stochastic and therefore difficult to incorporate into the usually discrete and deterministic computer software model. Instead of having the freedom to select external devices that satisfy the requirements of the computer, the other system components usually dictate the requirements for the embedded computer. Furthermore, the order, timing, and required handling of input events by the computer is typically completely controlled by the other system components, rather than by the software designer. Events that occur in large numbers in a short time or simultaneously must be handled by the computer software in ways that will satisfy the needs and requirements of the larger system. Software requirements for embedded systems are typically allocated during the system engineering process.

Errors must also typically be handled differently in embedded systems than in ordinary computer systems. In most other computer systems, providing information that an error has occurred and discontinuing the processing of the erroneous transaction is satisfactory and perhaps even desirable. A human can then intervene to analyze the error and determine the appropriate recovery procedure. Although the computer system needs to provide corruption procedures (e.g. for erroneous entries in an electronic data base), the decision to make the correction can be handled externally and often off-line. In embedded systems, however, errors and failures must be dealt with immediately, and often the detection and recovery from errors must be automated. The computer must be robust (must continue to operate in a specified manner), even though other components of the system may fail. Also, the other components must typically be made robust in the face of computer errors and failures. Finally, embedded computer software must typically provide facilities to detect and recover from its own errors or, at the very least, to fail gracefully in a way that minimizes damage to the overall system.

FIG. 1 is a block diagram of a conventional embedded system 100. The embedded system 100 is shown to include a central processing unit (CPU) 102 coupled to a random access memory (RAM) 104, a FLASH memory 106, and a read-only memory (ROM) 108. CPU 102 can read and write from RAM 104 and FLASH Memory 106, in addition to reading data from ROM 108.

FIG. 2 is an illustration of how a conventional "run-from-RAM" embedded application is built. An image 200 of RAM 104 (of FIG. 1) is built along with an application. Image 200 is typically a picture of what RAM 104 will include. Image 200 typically includes code (text) and data. Image 200 is then compressed. Compressed RAM Image 202 is then stored in FLASH memory 106 (of FIG. 1). FLASH memory 106 typically includes an extractor which is utilized in conjunction with the compressed image. An extractor itself is a small executable image which can read compressed RAM image and write uncompressed RAM image to the RAM. During run-time, the compressed RAM Image 202 is then decompressed into RAM 104.

It is often highly desirable to restrict RAM, ROM, and FLASH memory as much as possible in an embedded computer system to reduce cost. The amount of code and data is limited by the size of the RAM in the embedded system.

It would be desirable to optimize the available RAM such that more computer code and data can be utilized with existing amount of RAM. Alternatively, it would be desirable to be able to utilize the same amount of computer code and data with less RAM. The present invention addresses such a need.

SUMMARY OF THE INVENTION

The present invention provides a system and method for reducing memory requirements in a low resource computer system. Although examples herein are described in terms of embedded systems, the present invention is equally applicable to other low resource computer systems, such as palmtops, and laptops. Accordingly, the term embedded system is herein meant to include palmtops and laptops, as well as traditional embedded systems. Memory requirements, such as RAM requirements, can be reduced by combining virtual memory with a secondary memory with statically compressed contents. According to embodiments of the present invention, executable image of memory, such as the image of RAM, is compressed at image production time. The compressed image is then stored in a non-volatile memory, such as FLASH memory. At run-time, when a request identifying a virtual address is received, it is determined whether a physical address in the physical memory, such as RAM, is associated with that virtual address. If there is no physical memory associated with that virtual address, then a physical address is obtained to be associated with that virtual address. The obtained physical address can be either an available physical address (having no current association with a virtual address), or a physical address which is made available (by severing a current association with a virtual address). Data related to the requested virtual address may be extracted from the compressed image stored in the non-volatile memory, decompressed, and stored in RAM at the location of the obtained physical address. The physical address may then be mapped in order to be associated with the requested virtual address.

A method according to an embodiment of the present invention for compressing data for use in an embedded computer system is presented. The method comprising the steps of providing a pageable region of an image of memory, the pageable region including at least one pageable page; providing a non-pageable region of the image of memory, the non-pageable region including at least one non-pageable page; and compressing a pageable page by referring to the at least one non-pageable page.

In another aspect of the present invention, a system according to an embodiment of the present invention for compressing data for use in an embedded computer system is presented. The system comprises a means for providing a pageable region of an image of memory, the pageable region including at least one pageable page; a means for providing a non-pageable region of the image of memory, the non-pageable region including at least one non-pageable page; and a means for compressing a pageable page by referring to the at least one non-pageable page.

A system according to an embodiment for compressing data for use in an embedded computer system is also presented. The system comprising a non-volatile memory which provides a pageable region of an image of memory, the pageable region including at least one pageable page, the non-volatile memory also providing a non-pageable region of the image of memory, the non-pageable region including at least one non-pageable page; and a processor configured to initiate compression of a pageable page by referring to the at least one non-pageable page.

BRIEF DESCRIPTION OF THE DRAWINGS

FIG. 11 is a flow diagram of a method according to the first embodiment of the present invention for paging-in.

FIG. 12 is a flow diagram of a method according to the second embodiment of the present invention for paging-in.

FIG. 14 is an illustration according to the first, second, and third embodiments of the present invention for areas in non-volatile memory which are accessed during a decompression data offset.

FIG. 19 is a flow diagram of a method according to the third embodiment of the present invention for paging-in.

DETAILED DESCRIPTION OF THE PREFERRED EMBODIMENTS

The following description is presented to enable one of ordinary skill in the art to make and to use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
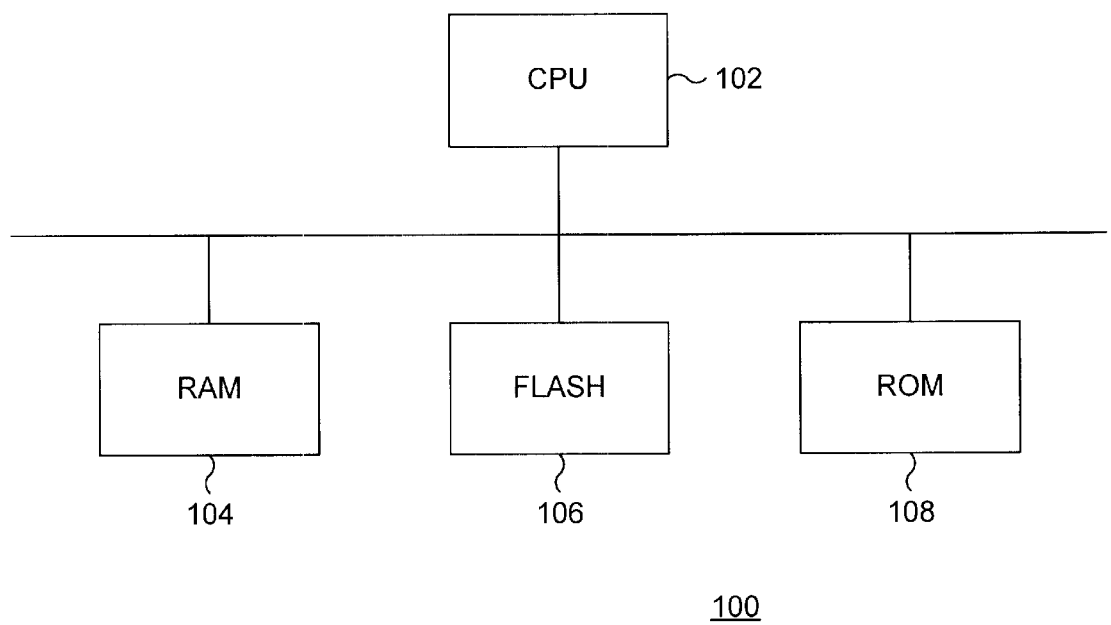
FIG. 1 is a block diagram of a conventional embedded system.
Figure 2:
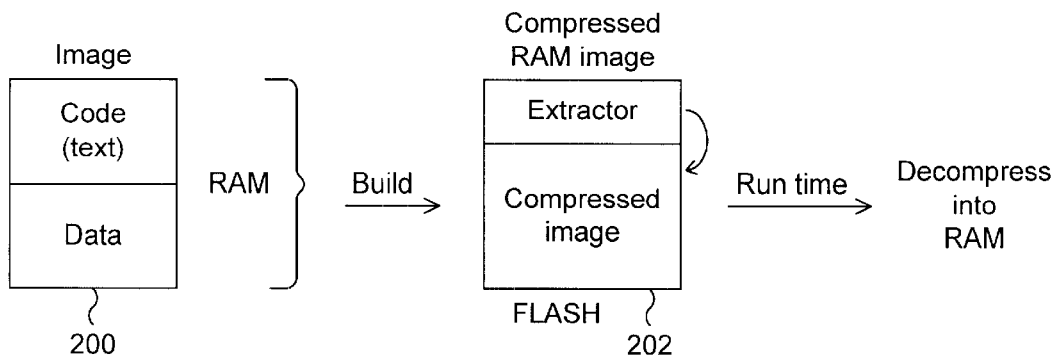
FIG. 2 is an illustration of a conventional method of building an application in an embedded system.
Figure 3:
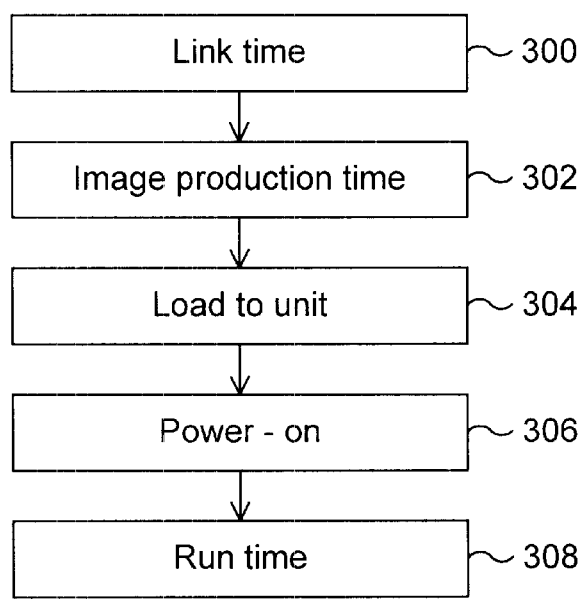
FIG. 3 is a flow diagram of building an application and image boot process.

FIG. 3 is a flow diagram of building an application and image boot processing. This process includes link process time, wherein data with given memory addresses are associated with memory in the system, via step 300. Image production follows link, via step 302. During image production time, an image of contents to be loaded into memory, such as RAM, is produced, via step 302. This produced image is then loaded onto an embedded system, via step 304. The embedded system is then powered, via step 306, and run time follows, via step 308. During run time, applications are run on the embedded system.

Figure 4:
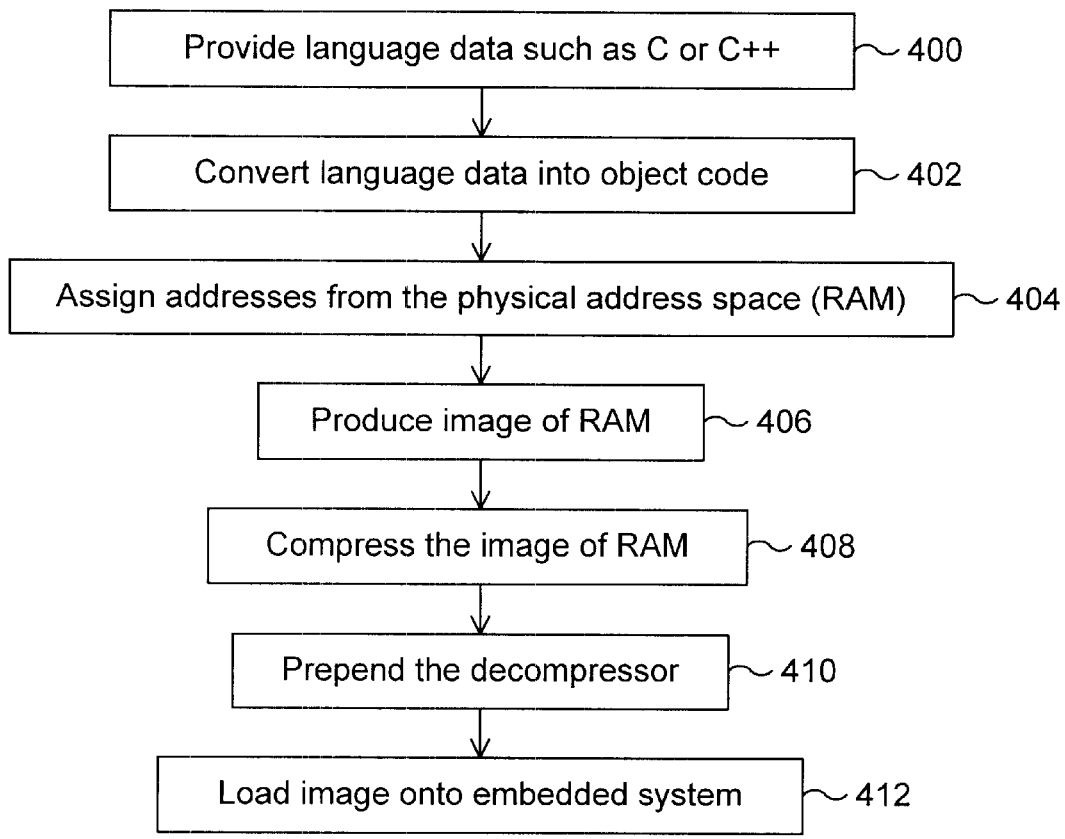
FIG. 4 is a more detailed flow diagram of a method for building an application.

FIG. 4 is a more detailed flow diagram of how an application is built in an embedded system. Language data, such as C or C++ are provided, via step 400. This language data is then converted into object code, via step 402. Addresses are then assigned from the physical address space (RAM), via step 404. An image of RAM is then produced, wherein the image of RAM includes contents to be loaded into the RAM, via step 406. This produced image of RAM is then compressed, via step 408. Thereafter, the decompressor is prepended, via step 410. When the decompressor is prepended, the compressed RAM image is in a form that can be extracted.. The compressed image is then loaded onto the embedded system, via step 412.

Figure 5:
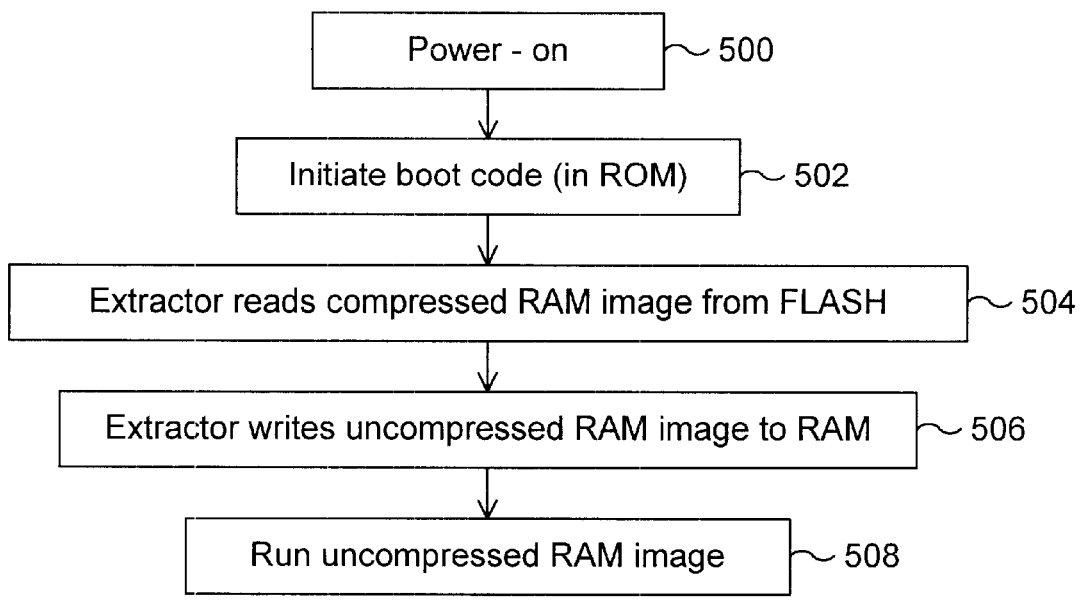
FIG. 5 is a more detailed flow diagram of an image boot process.

FIG. 5 is a flow diagram of a method for image boot processing, which typically occurs at run time. The embedded system is powered on, via step 500. Image boot code is then initiated, via step 502. The image boot code is typically stored in ROM. An extractor then reads compressed RAM image from FLASH memory, via step 504. As previously mentioned, the extractor is a small executable image which can read compressed RAM image and write uncompressed RAM image to the RAM. The extractor then writes uncompressed RAM image onto the RAM, via step 506. The uncompressed RAM image is then run, via step 508.

As previously discussed, the present invention provides a system and method for reducing memory requirements in a low resource computer system. Although examples herein are described in terms of embedded systems, such as an embedded router, the present invention is equally applicable to other low resource computer systems, such as palmtops, and laptops. Memory requirements, such as RAM requirements, can be reduced by combining virtual memory with a secondary memory with statically compressed contents. According to embodiments of the present invention, an executable image of memory, such as the image of RAM, is compressed at image production time. This compression is performed prior to run-time (i.e., static compression is performed). The compressed image is then stored in a non-volatile memory, such as FLASH memory. At run-time, when a request identifying a virtual address is received, it is determined whether a physical address in the physical memory, such as RAM, is associated with that virtual address. If there is no physical memory associated with that virtual address, then a physical address is obtained to be associated with that virtual address. The obtained physical address can be either an available physical address (having no current association with a virtual address), or a physical address which is made available (by severing a current association with a virtual address). Data related to the requested virtual address may be extracted from the compressed image stored in the non-volatile memory, decompressed, and stored in RAM at the location of the obtained physical address. The physical address may then be mapped in order to be associated with the requested virtual address.

Three embodiments are presented herein as examples of the present invention.

A first embodiment is a system and method according to the present invention which may utilize a Lempel-Ziv 77 (LZ77) compression/decompression method and variations of the LZ77 compression/decompression method. The first embodiment also includes utilization of a hardware decompressor. A second embodiment is a system and method according to the present invention which may also utilizes an LZ77 compression/decompression method and variations of the LZ77 compression/decompression method. However, the second embodiment utilizes a software decompressor. A third embodiment is also presented. The third embodiment is a system and method according to the present invention which may utilize a non-LZ77 compression/decompression method, such as arithmetic compression, PPM compression, or Huffman encoding, with either a hardware of a software decompressor.

According to embodiments of the present invention, compression is performed during image production time. Preferably, no dynamic run-time compression is performed. When a stale frame (a frame which has not been referenced recently and which has not been changed) is paged-out (a physical address is made available by disassociating the physical address with a virtual address), the mapping associated with the stale frame (a virtual to physical address mapping) is preferably deleted. Additionally, decompression may be optimized by utilizing decompression tables to assist in decompression. By using the virtual memory for actual virtual memory paging, embodiments of the present invention facilitate the use of the RAM for storing only approximately the decompressed pages required for current operation.

Virtual memory may be used to run either more or larger programs than could otherwise run in available RAM. One advantage of utilizing virtual memory is the ability to maintain a low cost by keeping the size of RAM 606 low.

In order to utilize virtual memory effectively, an additional level of addressing is imposed upon the level that is used to actually address real RAM; i.e. programs run in a virtual address space that is larger than the underlying physical address space. A set of addresses that a processor can generate as it executes a program is called the address space (or space) of the program. Address space can be virtual or physical. Virtual address space is typically determined by the software developer, and usually has few constraints. Physical space is typically determined by a hardware developer. The set of addresses recognized by the hardware of a system is called the physical address space of the machine. In virtual memory systems, the virtual address space is typically larger than the physical address space. If the virtual address space is larger than the memory space, the virtual memory system moves information into, and out of, RAM as it is needed, to simulate the appearance that the whole address space is in RAM. Hardware and software combine to maintain the illusion to the program that it is running on a single large address space.

Figure 6:
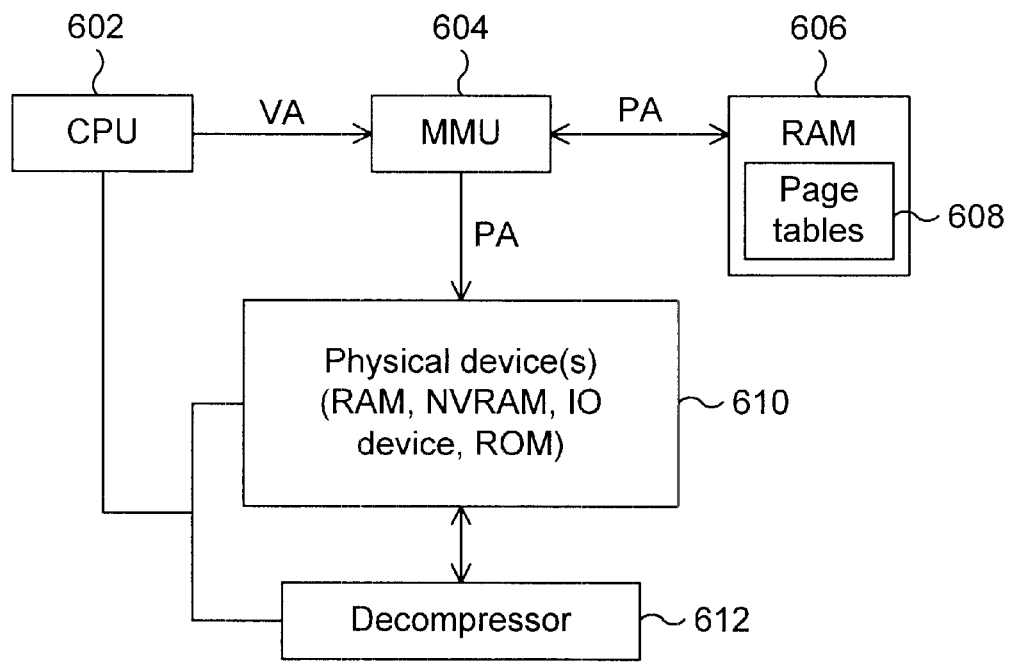
FIG. 6 is a block diagram of a system according to first and third embodiments of the present invention for reducing memory requirements in an embedded system.

FIG. 6 is a block diagram of a system according to the first and third embodiments of the present invention for reducing memory requirements in an embedded system. As previously mentioned, the first embodiment is a system and method according to the present invention which may utilize LZ77 compression/decompression and variations of LZ77 decompression. The first embodiment also includes utilization of a hardware decompressor. The third embodiment is a system and method according to the present invention which utilizes a non-LZ77 compression/decompression method, such as arithmetic compression, PPM, or Huffman encoding, with either a hardware of a software decompressor.

FIG. 6 illustrates one embodiment of an embedded computer system. Other computer system architectures and configurations can be used for carrying out the processing of the present invention. Embedded computer system 600, includes at least one microprocessor subsystem (also referred to as a central processing unit, or CPU) 602. That is, CPU 602 can be implemented by a single chip processor or by multiple processors. Using instructions received from memory, such as RAM 606 and physical device(s) 610, the CPU 602 controls the reception and manipulation of input data and the output and display of data on output devices.

CPU 602 is coupled bi-directionally with RAM 606. As is well known in the art, RAM 606 can store programming instructions and data, in the form of data objects and text objects, in addition to other data and instructions for processes operating on CPU 602. Also as well known in the art, primary storage typically includes basic operating instructions, program code, data and objects used by the CPU 602 to perform its functions.

RAM 606 is shown to include page tables 608. Page tables 608 maintain mapping information regarding associations between virtual addresses and their associated physical addresses located in RAM 606.

CPU 602 is shown to be coupled with Memory Management (MMU) 604. The MMU 604 can map virtual addresses received from CPU 602 to physical addresses in RAM 606. It is possible that there are more virtual addresses than physical addresses such that the relationship between virtual address to physical address is many to one. The virtual memory utilized via MMU 604 is broken into pages, preferably of identical size. A page in a virtual memory is typically specified by the MMU 604. The size of a virtual memory page may be any size, typically a power of two, such as 4K–16 KB. The physical address in RAM 606 is also broken into pages, called page frames. Each virtual page preferably starts at a physical page. Any page can be stored in any page frame. A mapping table can specify the page frame in which each page is stored. In translating a virtual address to a physical address, a page frame number can be substituted for a page number.

If a virtual address requested by CPU 602 does not have a corresponding physical address, then MMU 604 will generate an exception, referred to as a "page fault". When a page fault occurs, a preexisting mapping of a virtual address to a physical address is discarded, producing a newly available physical address. This newly available physical address can then be mapped to the virtual address which caused the page fault. MMU 604 keeps track of the virtual address to physical address mapping.

MMU 604 is also shown to be coupled to physical device(s) 610 which store the compressed RAM image. Examples of such physical devices include RAM, nonvolatile memory, such as ROM or FLASH, input/output devices (IO devices), and read only memory (ROM). The physical devices 610 and a decompressor 612 are also shown to be coupled with each other, as well as to CPU 602. The decompressor 612 may be a standard decompressor, such as a decompressor made by HiFn. Decompressor 612 may decompress compressed data stored in nonvolatile memory for preparation to be stored in a decompressed form into RAM.

Figure 7:
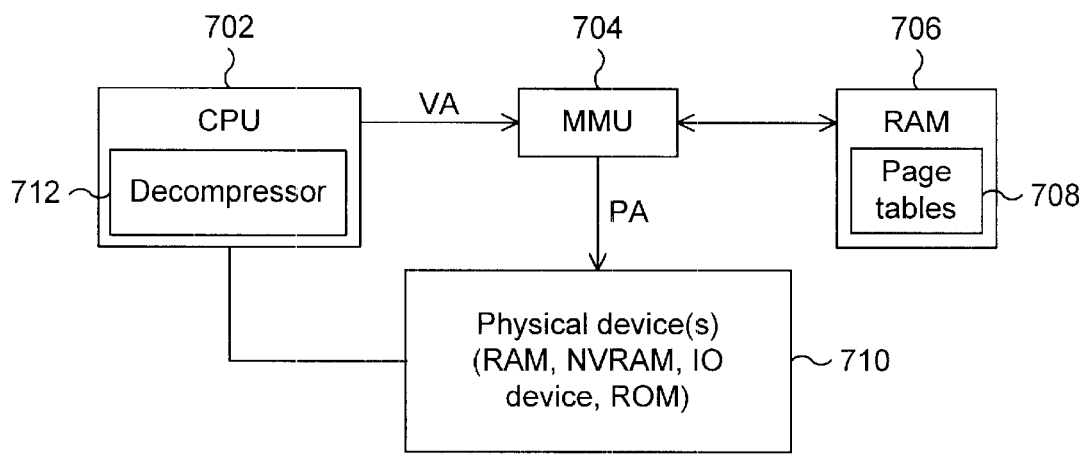
FIG. 7 is a system according to a second and third embodiments of the present invention for reducing memory requirements in an embedded system.

FIG. 7 shows a block diagram of a system according to the second and third embodiments of the present invention. As previously mentioned, the second embodiment is a system and method according to the present invention which may utilize LZ77 decompression and variations of LZ77 decompression. The second embodiment also utilizes a software decompressor. The third embodiment is a system and method according to the present invention which may utilize a non-LZ77 compression/decompression method, such as arithmetic compression, PPM, or Huffman encoding, with either a hardware of a software decompressor.

The embedded system 700 of FIG. 7 is shown to have a software decompressor 712 rather than a hardware decompressor 612 (of FIG. 6). FIG. 7 illustrates one embodiment of an embedded computer system. Other computer system architectures and configurations can be used for carrying out the processing of the present invention. This embedded system 700 is shown to include a CPU 702, an MMU 704, a RAM 706, and physical device 710. CPU 702 can be implemented by a single chip processor or by multiple processors. Using instructions received from memory, such as RAM 706 and physical device(s) 710, the CPU 702 controls the reception and manipulation of input data and the output and display of data on output devices. CPU is shown to include decompressor 712 which can decompress compressed data stored in non-volatile memory, such as NVRAM, in preparation to be stored in decompressed form in RAM 706.

CPU 702 is coupled bi-directionally with RAM 706. As is well known in the art, RAM 706 can store programming instructions and data, in the form of data objects and text objects, in addition to other data and instructions for processes operating on CPU 702. Also as well known in the art, primary storage typically includes basic operating instructions, program code, data and objects used by the CPU 702 to perform its functions.

RAM 706 is shown to include page tables 708. Page tables 708 maintains mapping information between virtual addresses and their associated physical addresses located in RAM 706.

CPU 702 is shown to be coupled with Memory Management (MMU) 704. The MMU 704 can map virtual addresses received from CPU 702 to physical addresses in RAM 706. It is possible that there are more virtual addresses than physical addresses such that the relationship between virtual address to physical address is many to one. The virtual memory utilized via MMU 704 is broken into pages, preferably of identical size. A page in a virtual memory is typically specified by the MMU 604. The size of a virtual memory page may be any size, typically a power of two, such as 4K–16 KB. The physical address in RAM 706 is also broken into pages, called page frames. Each virtual page preferably starts at a physical page. Any page can be stored in any page frame. A mapping table can specify the page frame in which each page is stored. In translating a virtual address to a physical address, a page frame number can be substituted for a page number.

If a virtual address requested by CPU 702 does not have a corresponding physical address, then MMU 704 will generate an exception, referred to as a "page fault". When a page fault occurs, a preexisting mapping of a virtual address to a physical address is discarded, producing a newly available physical address. This newly available physical address can then be mapped to the virtual address which caused the page fault. MMU 704 keeps track of the virtual address to physical address mapping.

MMU 704 is also shown to be coupled to physical device(s) 710. Examples of such physical devices include RAM, nonvolatile memory, such as nonvolatile memory (NVRAM), input/output devices (IO devices), and read only memory (ROM).

Figure 8:
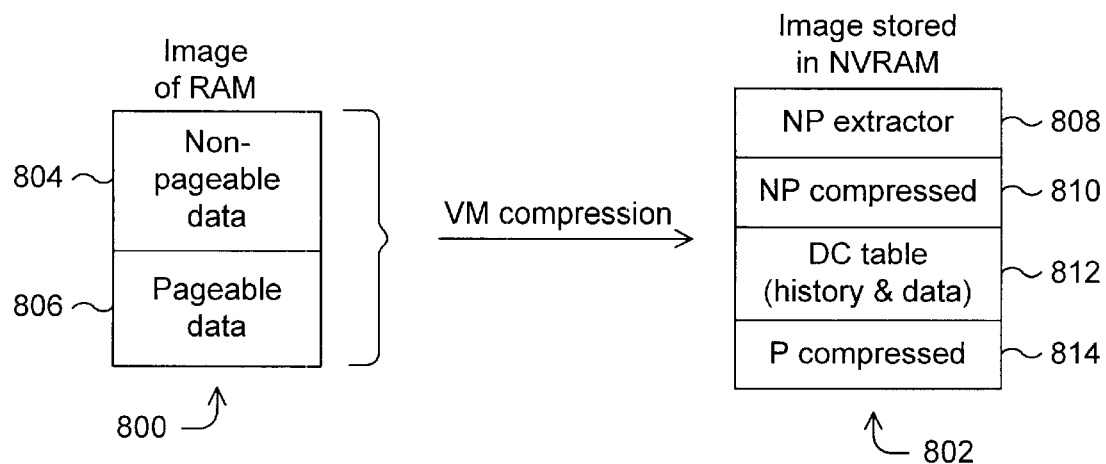
FIG. 8 is an illustration of a method according to the first and second embodiments of the present invention for building an application.

FIG. 8 is an illustration of a method according to the first and second embodiments of the present invention for building an application for an embedded system. An image 800 of memory, such as RAM, is created. The image 800 includes a non-pageable data section 804 and a pageable data section 806. Nonpageable data section 804 includes data which, once loaded into RAM, will not leave RAM by a page out. Freeing up a physical address is herein referred to as "page out". Examples of nonpageable data include data related to a pager or a scheduler which are essential to the fundamental operations of the embedded system.

Pageable data section 806 includes data which may be removed from RAM. Pageable data section 806 is designated into pages, such as 4 KB, which can be individually compressed and individually decompressed. The image 800 of RAM goes through a process of virtual memory compression to produce an image 802 stored in nonvolatile memory, such as FLASH or ROM, referred to here as NVRAM. Details of the virtual memory compression will be discussed later in conjunction with FIG. 10.

The image 802 stored in NVRAM includes a non-pageable extractor 808, a non-pageable compressed section 810, decompression (DM) tables 812, and pageable compressed section 814. Non-pageable extractor 808 is a small executable image which runs the compressed non-pageable

810 section. The non-pageable compressed section 810 includes the compressed version of the non-pageable data section 804 of the image 800 of RAM. Decompression (DM) tables 812, in this example, can include a history table and a data table. Further details of the history table and the data table will be discussed later in conjunction with FIGS. 9–14. The pageable compressed section 814 includes a compressed version of the pageable data section 806 of the image 800 of RAM.

Figure 9:
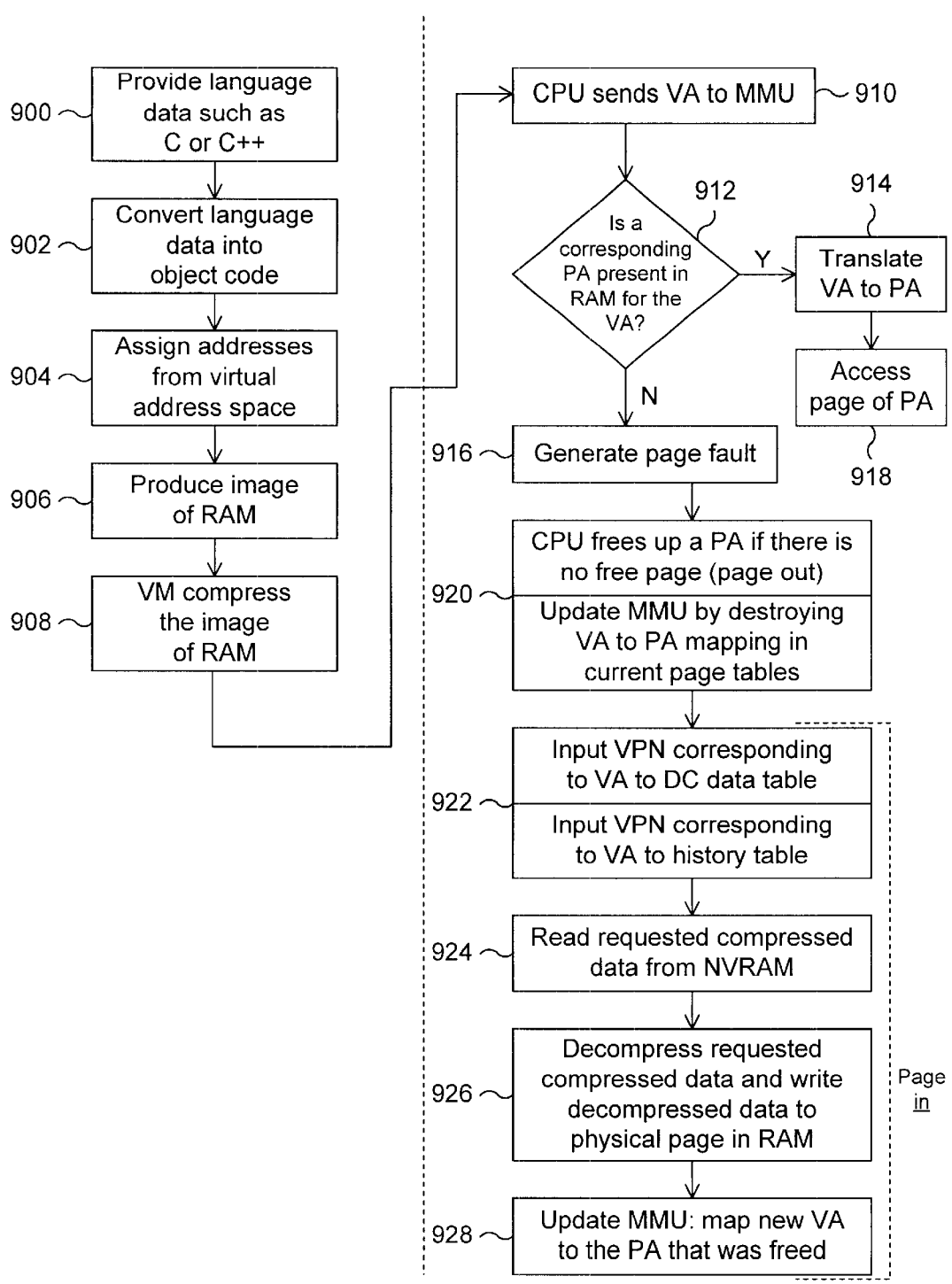
FIG. 9 is a flow diagram according to the first and second embodiments of the present invention for reducing memory requirements in an embedded system.

FIG. 9 is a flow diagram of a method according to the first and second embodiments of the present invention for reducing memory requirements in an embedded system. This embodiment corresponds to both the hardware compressor system of FIG. 6 and the software compressor system of FIG. 7 and utilizes an LZ77 or LZ77 variation decompression method.

The example shown on FIG. 9 takes place over two time periods: Image production time and run time. Image production time is expected to occur at the system manufacturer's location. In contrast, run time should occur after the manufacturer has released the embedded system and programs can then be run on the embedded system.

The first portion of the method occurs during image production time. First, language data is provided via step 900. Examples of language data include C or C++. This language data is then converted into object code via step 902. Addresses from virtual address space is then assigned, via step 904. During the step of linking to memory, addresses are assigned to text and data from virtual space (pageables) and from physical space (non-pageables). An image of RAM is then produced, via step 906. The image of RAM then goes through a process of virtual memory compression, via step 908. The process of virtual memory compression according to the first and second embodiments will be discussed in detail later in conjunction with FIG. 10.

Thereafter, during run time, the remainder of the method according to the first and second embodiments of the present invention occurs. The CPU sends a virtual address to the MMU, via step 910. It is then determined whether a corresponding physical address is present in RAM for the virtual address, via step 912. If there is a corresponding physical address present in RAM for the virtual address, then the virtual address is translated to the physical address via step 914. Thereafter, an appropriate page of the physical address is accessed, via step 918. Steps 912–918 may be executed by the MMU.

If a corresponding physical address is not present in RAM for the virtual address, via step 912, then a page fault is generated to indicate that a physical address is required for the virtual address, via step 916. If an unassigned physical address exists, then that address is assigned to the virtual address. Otherwise, the CPU then frees up a physical address if there is no free physical address, via step 920. Freeing up a physical address, is herein referred to as "page out". When a physical address is freed, the MMU is updated by destroying a virtual address to physical address mapping in the current page tables to reflect the change in the currently freed physical address due to the page out, via step 920.

A virtual page number corresponding to the virtual address is then input to the decompression data table, via step 922. The virtual page number corresponding to the virtual address is used as an index to the decompression data table to obtain the offset in the image of block to be decompressed. The decompression data table identifies the offset for each virtual page number from the beginning of an image. Accordingly, when a given piece of compressed data is requested, it can be located, despite the fact that it is in compressed form. The data table is preferably static after virtual memory initialization. The data table may be generated either at virtual memory initialization or during image production. Additionally, the virtual page number is also input to a history table, via step 922. The history table is generated during virtual memory image production and is preferably static thereafter. Step 922 allows the determination of parameters for decompression. The data table and history table are collectively called decompression (DC) tables, as shown in the decompression tables 812 of FIG. 8.

The decompression history table points to decompressed non-pageable area either RAM or ROM. This compression related data later be retrieved to assist during decompression. For example, the history table can be used to specify that a piece of compressed data should be decompressed using an ASCI page because the data prior to compression was originally in ASCI. Further details of the history table according to the first and second embodiments will later be discussed in conjunction with FIGS. 10–14.

Requested compressed data is then read from nonvolatile RAM, via step 924. Requested compressed data is then decompressed and written to the recently freed physical page in RAM, via step 926. The MMU is also updated such that a new mapping of the virtual address to the recently freed physical address is created, via step 928. Steps 922–928 are herein referred to as "page-in", further details of which will later be discussed in conjunction with FIGS. 11 and 12.

Figure 10:
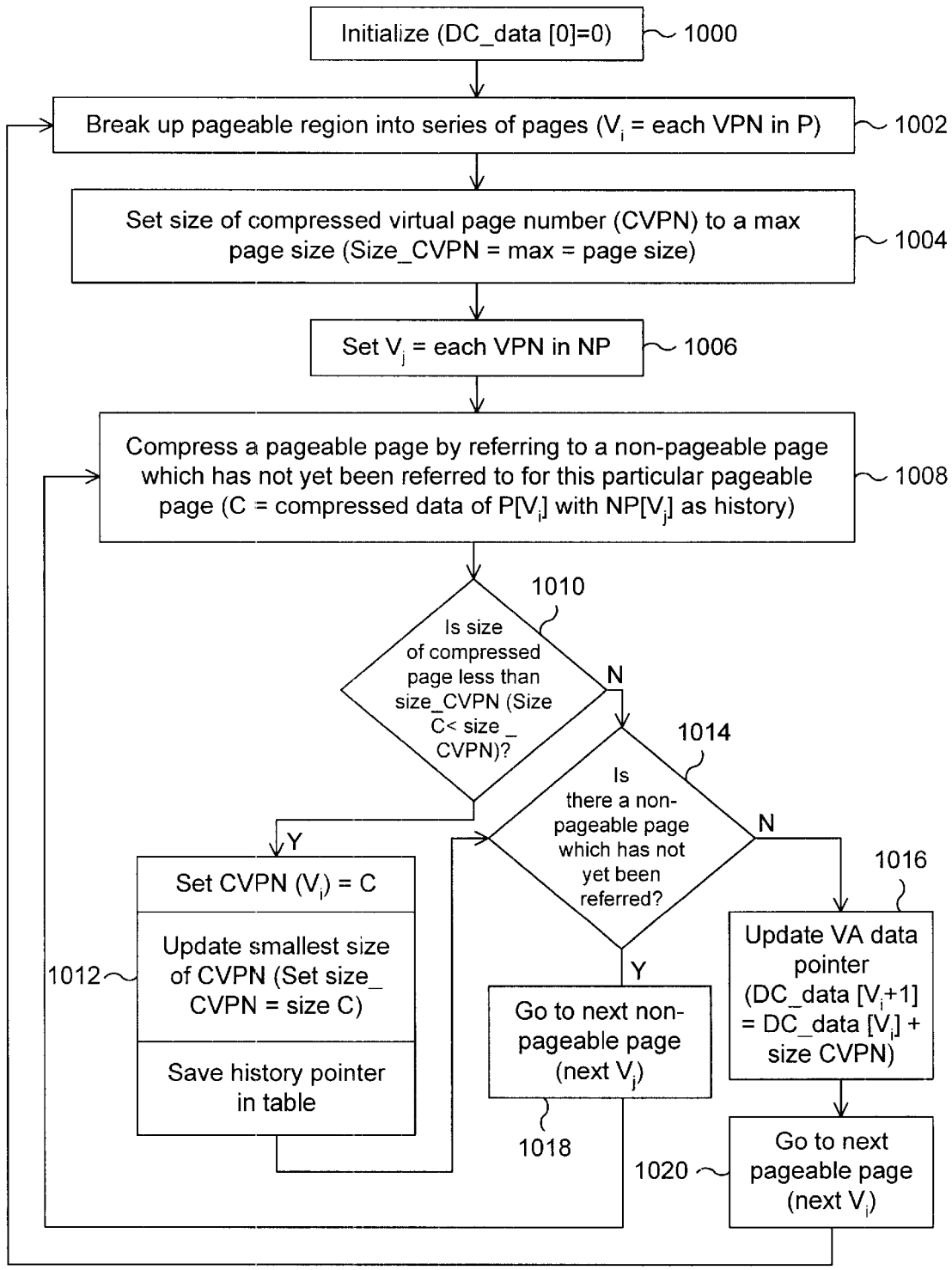
FIG. 10 is a flow diagram of a method according to the first and second embodiments of the present invention for virtual memory compression.

FIG. 10 is a flow diagram of a method according to the first and second embodiments of the present invention for virtual memory compression, such as the virtual memory compression described in step 908 of FIG. 9 and the virtual memory compression described in FIG. 8. First, initialization takes place, via step 1000. For example, DC_data (0)=0. DC_data (x) indicates an offset of compressed data for virtual page number X+least valid virtual page number. Accordingly, DC_data(0)=0, indicates that the first compressed page starts at the beginning. The pageable region is then broken up into a series of pages, via step 1002. Each virtual page number in the pageable region can be set equal to $V_i$. The size of a compressed virtual page number (CVPN) is then set equal to a maximum page size (SIZE_CVPN= MAX=PAGE SIZE), via step 1004.

$V_j$ is then set equal to each successive virtual page number in the non pageable region, via step 1006. A pageable page is then compressed by referring to a nonpageable page which has not yet been referred to for this particular pageable page (C=compressed data of $P(V_i)$ with NP ($V_j$) as history, wherein P is pageable region and NP is nonpageable region), via step 1008. Accordingly, as compression occurs, data regarding the compression of the particular page is stored in the history table for later reference during decompression. Referencing the non pageable page significantly improves compression ratio (i.e. the final image of RAM is smaller and requires less FLASH memory to store).

It is then determined whether a size of a compressed page is less than size_CVPN (Size C<Size_CVPN), via step 1010. If the size of a compressed page is less than Size_ CVPN, via step 1010, then CVPN ($V_i$) is set equal to C, via step 1012. Additionally, the smallest size of CVPN is updated (set size_CVPN=Size C), and a history pointer is also saved in the history table, via step 1012. In this manner, the virtual memory compression method attempts to achieve the smallest compressed size of the data.

Thereafter, step 1014 is performed. Step 1014 is also performed if the size of the compressed page is not less than Size_CVPN, via step 1010. According to step 1014, it is determined whether there is a nonpageable page which has not yet been referred. If there is a nonpageable which has not yet been referred, via step 1014, then the next nonpageable page ($V_j$) is evaluated, via step 1018. Thereafter, step 1008 is again performed.

If every nonpageable page has been referred, via step 1014, then a virtual address data pointer is updated (DC_DATA [$V_i+1$]=DC_DATA ($V_i$)+SIZE CVPN), via step 1016. The next pageable page is then evaluated (next $V_i$), via step 1020. Thereafter, step 1004 is again referenced.

Figure 11:
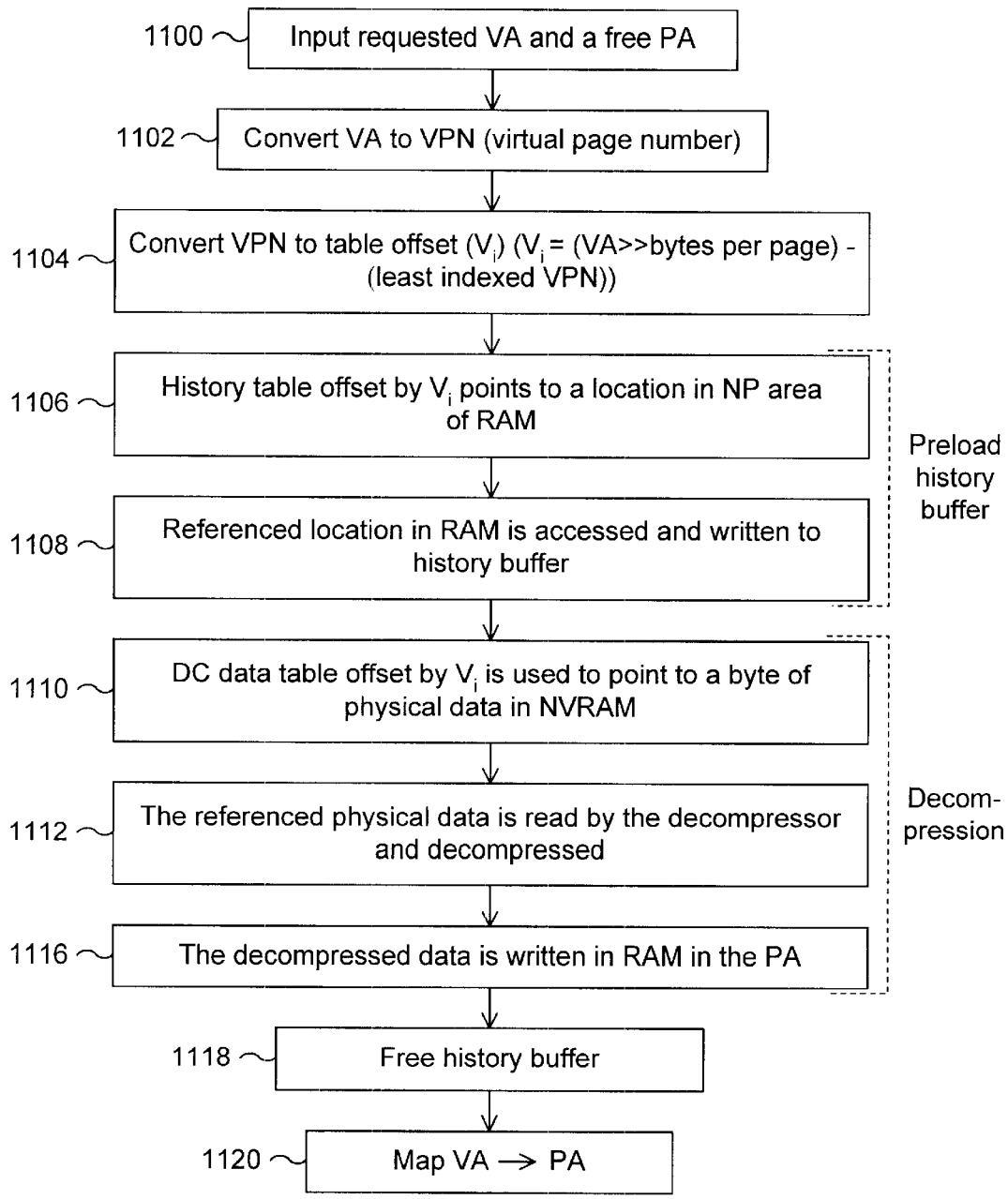

FIG. 11 is a flow diagram of a method according to the first embodiment of the present invention for paging-in, such as the page-in process described in FIGS. 922–928 of FIG. 9. This embodiment corresponds to the system shown in FIG. 6 which includes a hardware decompressor 612. Two pieces of information, virtual address and a free physical address, are input into the system, via step 1100. The purpose of the page-in process is to decompress and establish a proper mapping between the requested virtual address and a free or available physical address.

The virtual address is converted to a virtual page number (VPN), via step 1102. The virtual page number is then converted to a table offset ($V_i$) ($V_i$=(VA>>bytes per page)−(least indexed VPN)), via step 1104. The next two steps, steps 1106–1108, preloads the history buffer. The history table is used to specify the location of the data to load into the history buffer. The history table offset by $V_i$ points to a location in the nonpageable area of RAM, via step 1106. The offset ($V_i$) simply indicates the location of data in the history table. The referenced location in RAM is then accessed and written to the history buffer, via step 1108. The history buffer can be located in various places, such as RAM if the history buffer is in software form, or in the decompressor if the history buffer is in hardware form.

Once the history buffer is preloaded, the physical data in nonvolatile RAM is then decompressed, as described in steps 1110–1116. The decompression data table offset by the $V_i$ is used to point to a byte of physical data in nonvolatile RAM, via step 1110. The referenced physical data is then read by the decompressor and is decompressed, via step 1112. The decompressed data is then written in RAM in the physical address, via step 1116. The history buffer is then freed, via step 1118. The virtual address is then mapped to the physical address, via step 1120.

Figure 12:
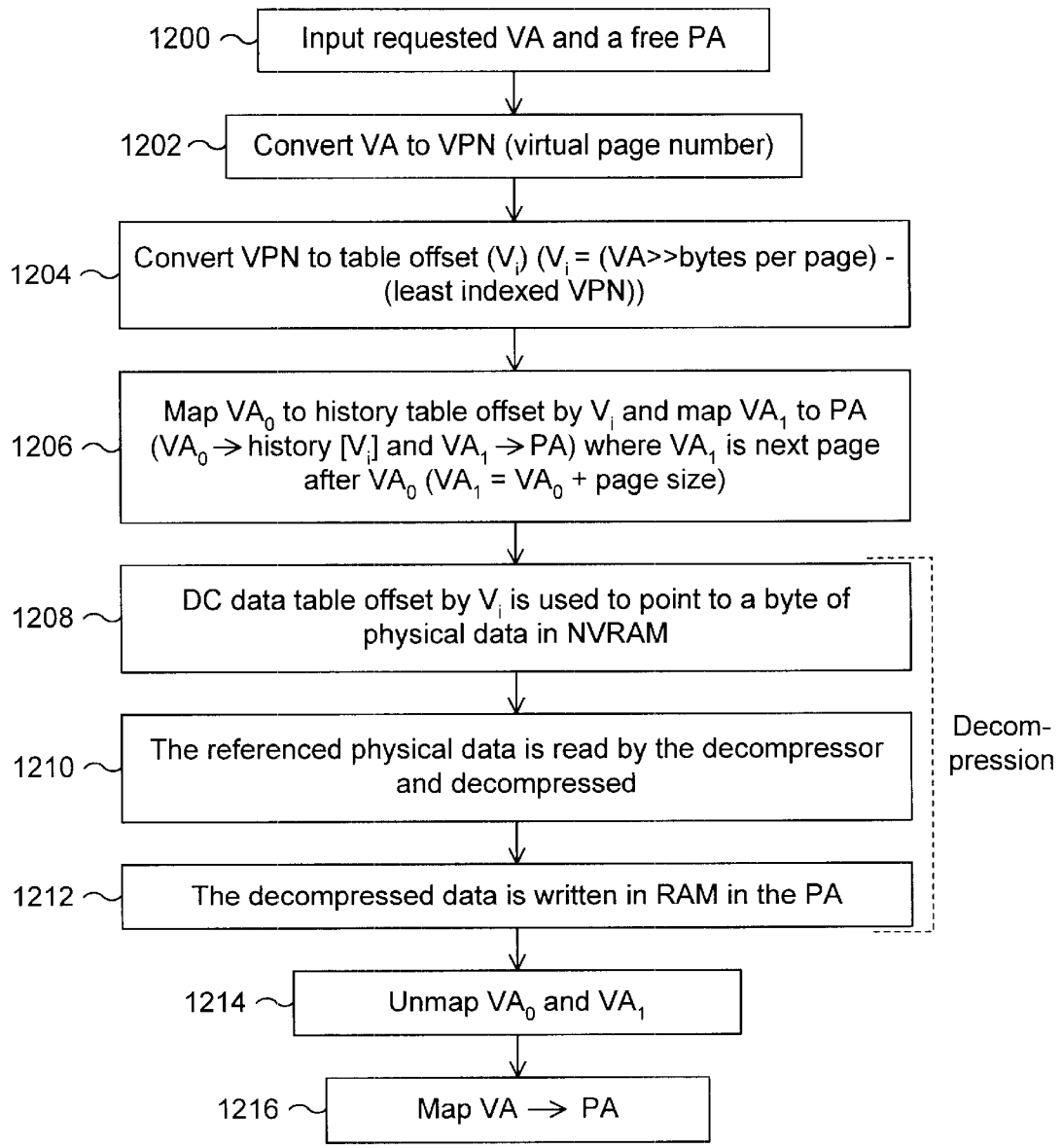

FIG. 12 is a flow diagram according to the second embodiment of the present invention for the process of paging-in, such as the process of paging-in as recited in steps 922–928 of FIG. 9. This embodiment corresponds to the system shown in FIG. 7 which includes a software decompressor 712. The requested virtual address and an available physical address are the inputs, via step 1200. The virtual address is then converted to a virtual page number (VPN), via step 1202. The virtual page number is then converted to a table offset ($V_i$) ($V_i$=(VA>>bytes per page)−(lest indexed VPN)), via step 1204. A table offset is an indication of where in the table the requested data associated with the virtual page number is located in the table.

Any unused pair of contiguous virtual addresses, $VA_o$ and $VA_1$, are mapped to a physical address of history (history ($V_i$)) and to the recently freed physical address, via step 1206. Mapping $VA_o$ and $VA_1$, to history ($V_i$) builds two pages of contiguous virtual address space such that the first page supplies history and the second supplies the destination for decompression data. This accomplishes the loading of the history buffer (step 1108 of FIG. 11) without copying any data.

Steps 1208–1212 perform decompression of the requested data from the nonvolatile RAM. The decompression data table offset $V_1$ is then used to point to a byte of physical data in nonvolatile RAM, via step 1208. The referenced physical data is then read by the decompressor and decompressed, via step 1210. The decompressed data is then written into RAM in the physical address, via step 1212. The mapping associated with $VA_o$ and $VA_1$ are then unmapped, via step 1214. The mapping can be unmapped now that the physical data has been decompressed since the mapping occurred for purposes of decompression. Finally, a mapping between the virtual address and the physical address is created via step 1216.

Figure 13:
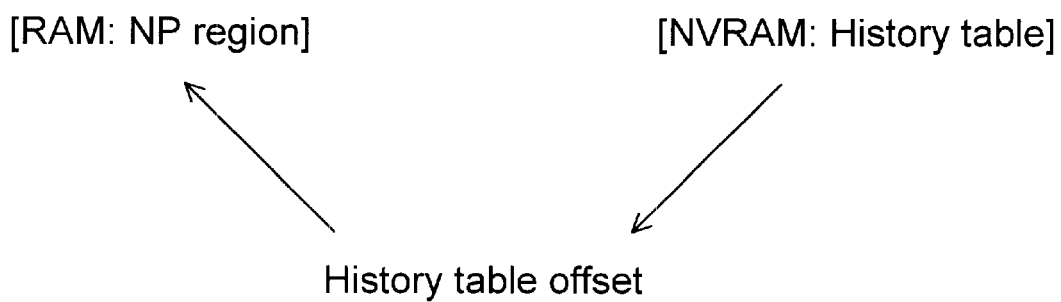
FIG. 13 is an illustration according to the first and second embodiments of the present invention for areas in RAM and non-volatile memory which are accessed during a history table offset.

FIG. 13 is an illustration of which areas the history table offset references. The history table offset (history [VPN]) identifies an address of uncompressed history data to be loaded into the history buffer to be used during decompression of page VPN. History [VPN] is kept in NVRAM or ROM. Its data references the NP region in RAM or ROM. It is preferably not changed during run time.

FIG. 14 illustrates areas in the system which the decompression data offset references. The decompression data offset (DCDATA[VPN]) is the offset of the compressed data for virtual page N from the start of the image. The data to be compressed is located by using the decompression data offset. DCDATA [VPN] is shown to reference the decompression data table, which is shown to be located in nonvolatile RAM but may instead be located in NVRAM. Data from the decompression data table is then used locate a compressed page for decompression.

Figure 15:
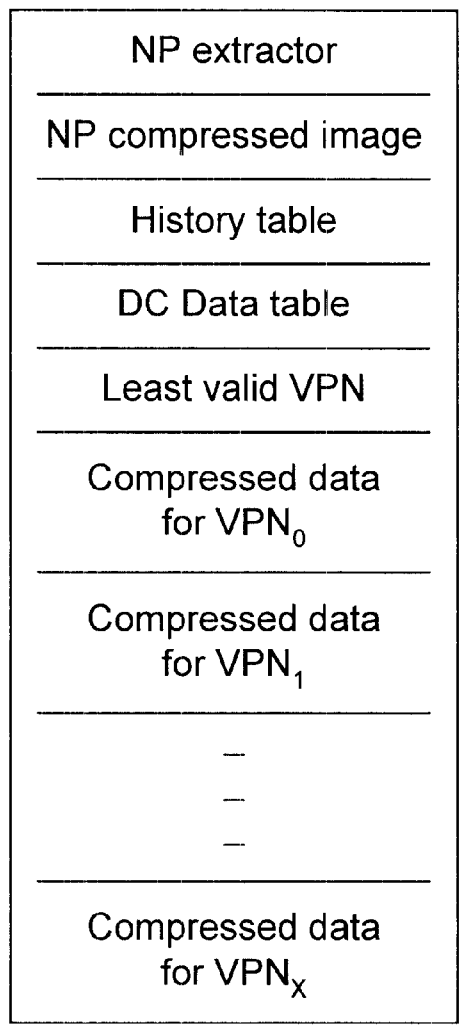
FIG. 15 is an example of a data format in nonvolatile memory according to the first and second embodiments of the present invention.

FIG. 15 illustrates an example of a data format in nonvolatile memory (NVRAM), such as ROM or FLASH, according to the first and second embodiments of the present invention. The data format in nonvolatile RAM is shown to include a nonpageable extractor, followed by a nonpageable compressed image, followed by a history table, followed by a decompression data table, followed by the least valid virtual page number, followed by compressed data for $VPN_o$, followed by compressed data for $VPN_1$, followed by compressed data for the remainder of the virtual page numbers, and ending with compressed data for $VPN_x$.

Figure 16:
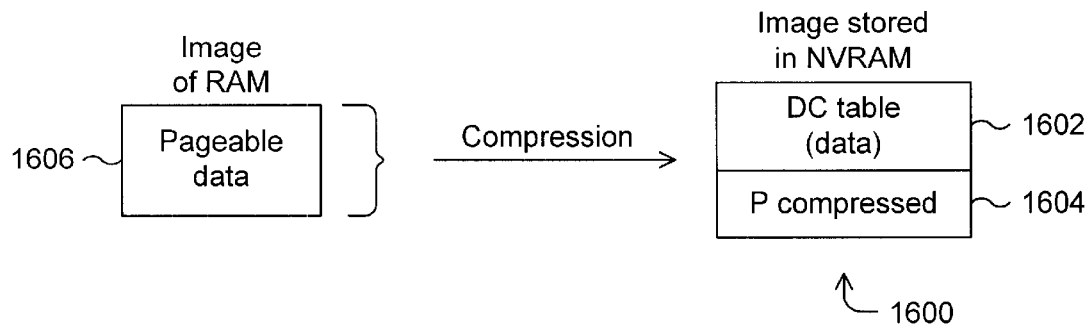
FIG. 16 is an illustration of a method according to the third embodiment of the present invention for building an application.

FIG. 16 is an illustration of an example for building an application according to the third embodiment of the present invention. In this embodiment, the image compression shown in FIG. 16 applies to both systems shown in FIGS. 6 and 7. Additionally, in this embodiment, a non LZ77 compression/decompression method may be utilized, such as arithmetic compression, PPM, or Huffman encoding.

In FIG. 16, an image 1606 of RAM is shown to include pageable data. The image of the RAM is processed through a virtual memory compression method and results in an image 1600 stored in nonvolatile memory, such as NVRAM. Details of virtual memory compression according to the third embodiment of the present invention will be discussed later in conjunction FIG. 18. The image 900 stored in NVRAM is shown to include a decompression table 1602, and a pageable compressed section 1604.

Figure 17:
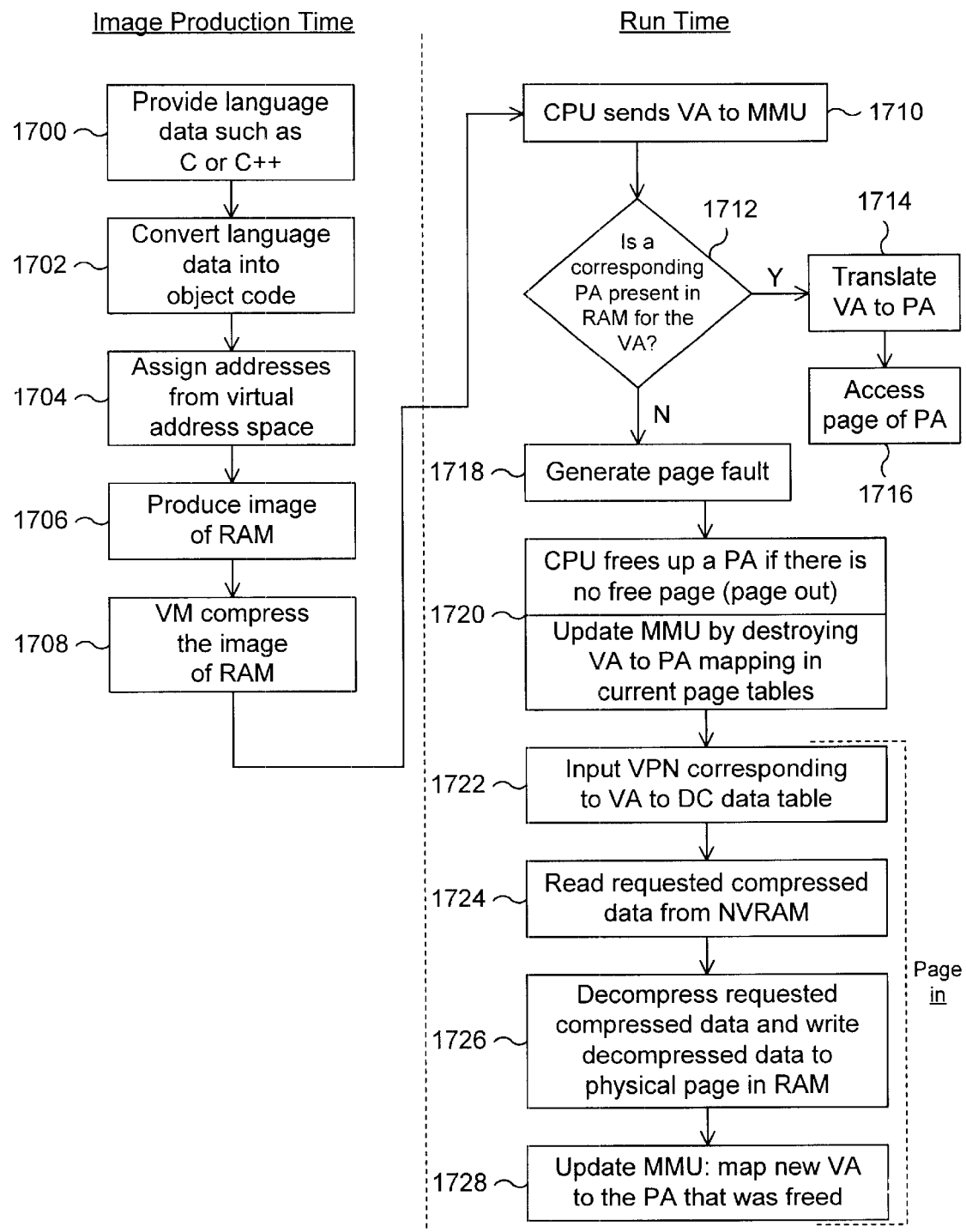
FIG. 17 is a flow diagram of a method according to the third embodiment of the present invention for reducing RAM requirements in an embedded system.

FIG. 17 shows a flow diagram of a method according to the third embodiment of the present invention for reducing memory requirements for an embedded system. This embodiment corresponds to the hardware decompressor embodiment of FIG. 6 as well as the software decompressor embodiment of FIG. 7. Additionally, this embodiment works in conjunction with a non-LZ77 variation compression/decompression method. Note that according to this embodiment, no history table is utilized.

The example shown on FIG. 17 takes place over two time periods: Image production time and run time. As previously stated, image production time is expected to occur at the system manufacturer's location. In contrast, run time should occur after the manufacturer has released the embedded system and programs can then be run on the embedded system.

The first portion of the method occurs during image production time. First, language data is provided via step 1700. Examples of language data include C or C++. This language data is then converted into object code via step 1702. Then the next step is linking to memory, such as RAM, via step 1704. During the step of linking to memory, data with given memory addresses are associated with memory in the system. An image of RAM is then produced, via step 1706. The image of RAM then goes through a process of virtual memory compression, via step 1708. The process of virtual memory compression according to the third embodiment will be discussed in detail later in conjunction with FIG. 18.

Thereafter, during run time, the remainder of the method according to the third embodiment of the present invention occurs. The CPU sends a virtual address to the MMU, via step 1710. It is then determined whether a corresponding physical address is present in RAM for the virtual address, via step 1712. If there is a corresponding physical address present in RAM for the virtual address, then the virtual address is translated to the physical address via step 1714. Thereafter, an appropriate page of the physical address is accessed, via step 1716.

If a corresponding physical address is not present in RAM for the virtual address, via step 1712, then a page fault is generated to indicate that a physical address is required for the virtual address, via step 1718. If a physical address is available, then that address is assigned to the virtual address. Otherwise, the CPU then frees up a physical address if there is no free physical address, via step 1720. Freeing up a physical address is herein referred to as "page out". When a physical address is freed, the MMU is updated by destroying a virtual address to physical address mapping in the current page tables to reflect the change in the currently freed physical address due to the page out, via step 1720.

A virtual page number corresponding to the virtual address is then fed to the decompression data table, via step 1722. In this embodiment, the data table comprises the decompression table, as shown in the decompression table 1602 of FIG. 16. The decompression table collects its data during runtime and is later utilized in the decompression process. The decompression data table identifies the location of a particular piece data. Accordingly, when a given piece of compressed data is requested, it can be located, despite the fact that it is in compressed form. Further details of the virtual table according to the third embodiment will later be discussed in conjunction with FIGS. 18–20.

Requested compressed data is then read from nonvolatile RAM, via step 1724. Requested compressed data is then decompressed and written to the recently freed physical page in RAM, via step 1726. The MMU is also updated such that a new mapping of the virtual address to the recently freed physical address is created, via step 1728. Steps 1722–1728 are herein referred to as "page-in", further details of which will later be discussed in conjunction with FIG. 19.

Figure 18:
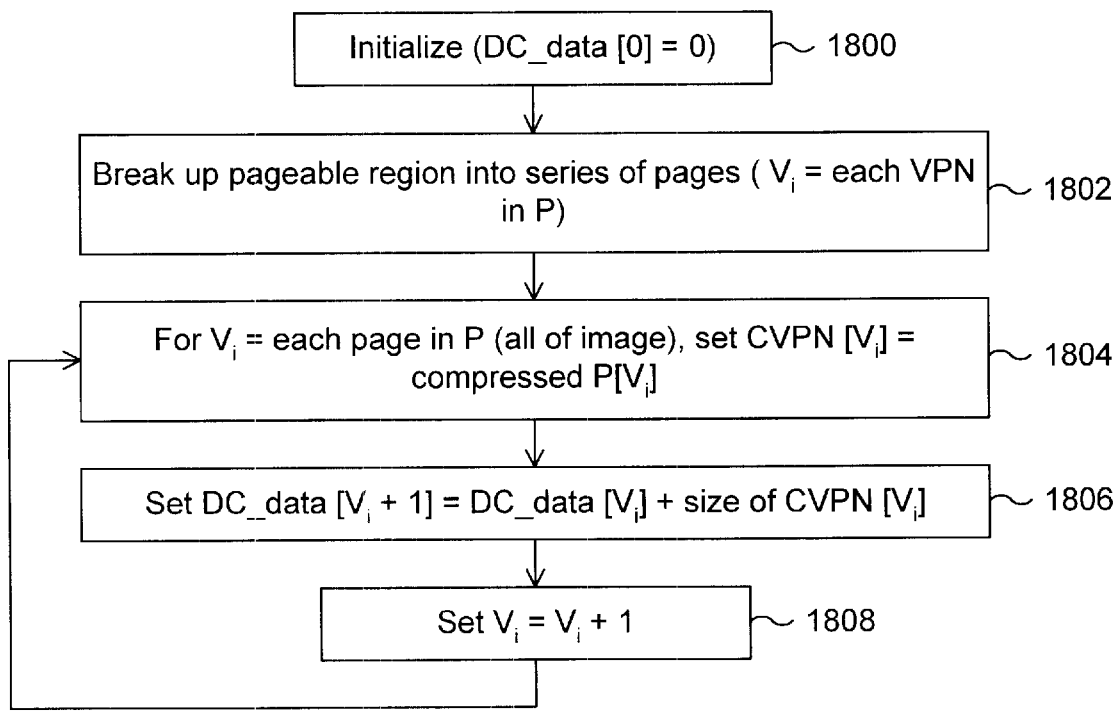
FIG. 18 is a flow diagram of a method according to the third embodiment of the present invention for virtual memory compression.

FIG. 18 is a flow diagram of a method according to the third embodiment of the present invention for virtual memory compression such as the virtual memory compression described in conjunction with FIG. 16 and step 1708 of FIG. 17.

First, decompression data is initialized (DC_DATA[0]=0), via step 1800. The pageable region is then broken into a series of pages ($V_i$=each virtual page number (VPN) in the pageable region (P)), via step 1802. CVPN [$V_i$] is set equal to compressed P[$V_i$], wherein $V_i$ indicates each page in the pageable region (P), via step 1804. In step 1804, P[$V_i$] is compressed and stored in CVPN [$V_i$]. DC_Data [$V_i$+1] is then set equal to DC_Data [$V_i$] plus the size of CVPN [$V_i$], via step 1806. $V_i$ is then incremented by 1, via step 1808. Thereafter, step 1804 is again referenced.

Figure 19:
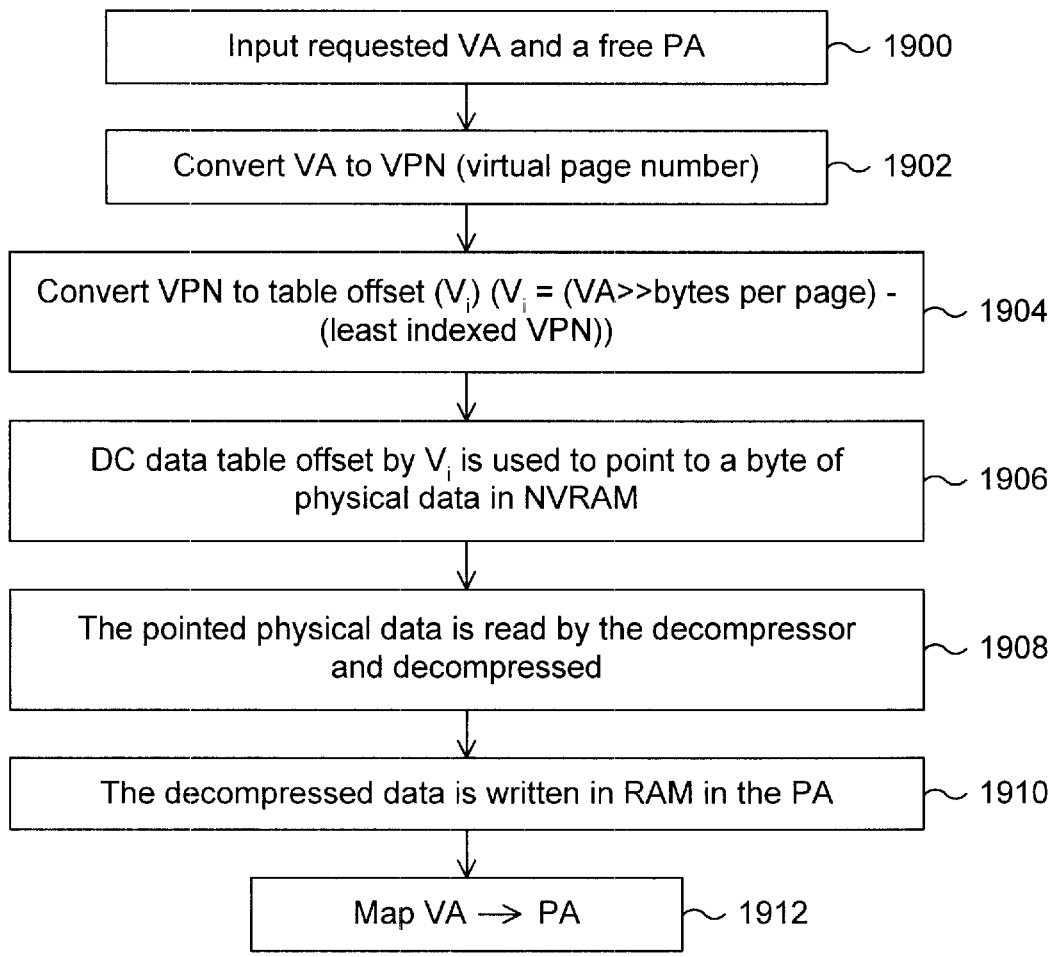

FIG. 19 is a flow diagram of a process according to the third embodiment of the present invention for paging-in, such as the process described by steps 1722–1728 of FIG. 17. A requested virtual address and an available physical address are the input, via step 1900. The virtual address is then converted into a virtual page number (VPN), via step 1902. The virtual page number is then converted to a table offset ($V_i$) ($V_i$=(VA>>bytes per page)−(least indexed VPN)), via step 1904. Decompression data table offset by $V_i$ is then used to point to a byte of physical data in nonvolatile RAM, via step 1906. The referenced physical data is then read by the decompressor and decompressed, via step 1908. The decompressed data is then written in RAM in the physical address, via step 1910. The virtual address is then mapped to be associated with the physical address, via step 1912.

Figure 20:
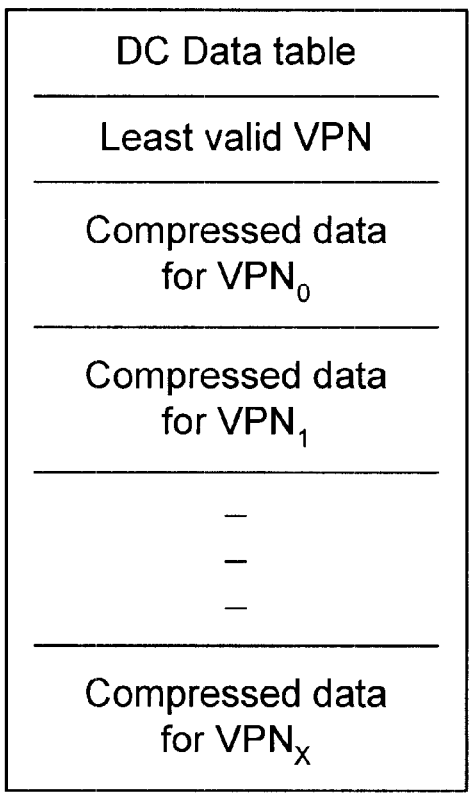
FIG. 20 is an illustration of data format in nonvolatile memory according to the third embodiment of the present invention.

FIG. 20 is an illustration of a data format in nonvolatile memory, such as nonvolatile RAM, according to the third embodiment of the present invention. In FIG. 20, the data format in nonvolatile RAM is shown to include decompression data table, followed by least valid virtual page number, followed by compressed data for $VPN_\emptyset$, followed by compressed data for $VPN_1$, followed by compressed data for the remainder of the virtual page numbers, ending with compressed data for $VPN_x$.

Note that the decompression data offset illustration of FIG. 14 also applies to the third embodiment. Accordingly, the virtual data memory offset (DCDATA[VPN]) refers to the compressed data for virtual page number, VPN.

A method and system for reducing memory requirements in an embedded system has been disclosed. Software written according to the present invention may be stored in some form of computer-readable medium, such as memory or CD-ROM, or transmitted over a network, and executed by a processor.

Although the present invention has been described in accordance with the embodiment shown, one of ordinary skill in the art will readily recognize that there could be variations to the embodiment and these variations would be within the spirit and scope of the present invention. Accordingly, many modifications may be made by one of ordinary skill in the art without departing from the spirit and scope of the appended claims.

What is claimed is:

1. A system for compressing data for use in an embedded computer system, the system comprising:
  a non-volatile memory which provides a pageable region of an image of memory, the pageable region including at least one pageable page, the non-volatile memory also providing a non-pageable region of the image of memory, the non-pageable region including at least one non-pageable page; and a processor configured to initiate compression of a pageable page by referring to the at least one non-pageable page;

wherein the at least one non-pageable page referred during compression has not yet been referred to for the pageable page.

2. The system of claim 1, wherein compression of the pageable region would provide a plurality of compressed pages.

3. The system of claim 2, wherein one of the plurality of compressed pages is selected.

4. The system of claim 3, wherein the selection of one of the plurality of compressed pages is based on a predetermined factor.

5. The system of claim 3, wherein the one of the plurality of compressed pages has a size which is smaller than a remainder of the plurality of compressed pages.

6. The system of claim 3, further comprising a table wherein information related to the selection of one of the plurality of compressed pages is saved.

7. A method for compressing data for use in an embedded computer system, the method comprising:

providing a pageable region of an image of memory, the pageable region including at least one pageable page;

providing a non-pageable region of the image of memory, the non-pageable region including at least one non-pageable page; and compressing a pageable page by referring to the at least one non pageable page;

wherein the at least one non-pageable page referred during compression has not yet been referred to for the pageable page.

8. The method of claim 7, wherein a size of a compressed page number is set to a maximum page size.

9. The method of claim 7, wherein compression of the pageable region would provide a plurality of compressed pages.

10. The method of claim 9, further comprising a step of selecting one of the plurality of compressed pages.

11. The method of claim 10, wherein the selection of one of the plurality of compressed pages is based on a predetermined factor.

12. The method of claim 10, wherein the one of the plurality of compressed pages has a size which is smaller than a remainder of the plurality of compressed pages.

13. The method of claim 10, further comprising a step of saving information related to the selection of one of the plurality of compressed pages.

14. The method of claim 13, wherein the information related to the selection of one of the plurality of compressed pages is saved in a history table.

15. A system for compressing data for use in an embedded computer system, the system comprising:

means for providing a pageable region of an image of memory, the pageable region including at least one pageable page;

means for providing a non-pageable region of the image of memory, the non-pageable region including at least one non-pageable page; and means for compressing a pageable page by referring to the at least one non-pageable page wherein the at least one non-pageable page referred during compression has not yet been referred to for the pageable page.

16. A computer program product for compressing data for use in an embedded computer system, the computer program product comprising:

computer code providing a pageable region of an image of memory, the pageable region including at least one pageable page;

computer code providing a non-pageable region of the image of memory, the non-pageable region including at least one pageable page;

computer code compressing a pageable page by referring to the at least one non-pageable page; and a computer readable medium that stores the computer codes;

wherein the at least one non-pageable page referred during compression has not yet been referred to for the pageable page.

17. The computer program product of claim 16, wherein the computer readable medium is selected from the group consisting of CD-ROM, floppy disk, tape, flash memory, system memory, hard drive, and data signal embodied in a carrier wave.

* * * * *